Feb. 16, 1932. K. BRACKELSBERG 1,845,228
PROCESS AND APPARATUS FOR MELTING DOWN EASILY FUSIBLE ALLOYS
Filed Aug. 14, 1930
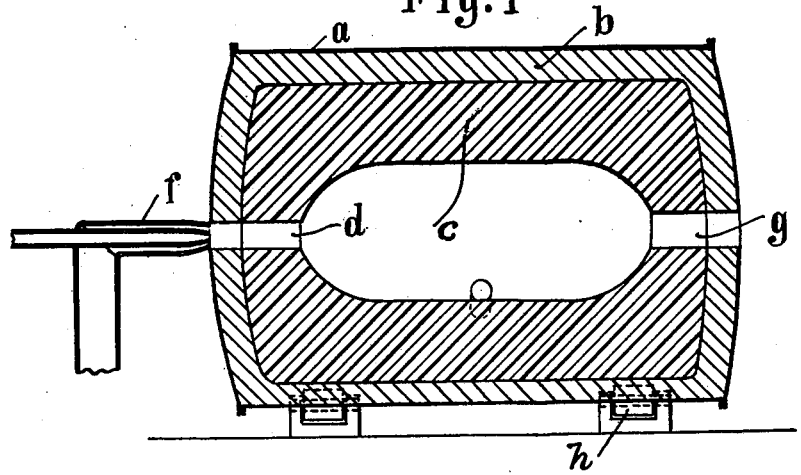
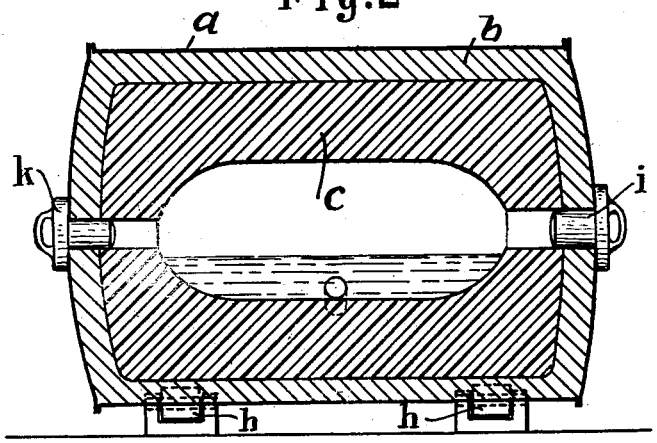
INVENTOR
Karl Brackelsberg, deceased,
by A. Brackelsberg.
BY [signature] Administrator.
ATTORNEY Patented Feb. 16, 1932

1,845,228

UNITED STATES PATENT OFFICE

KARL BRACKELSBERG, DECEASED, LATE OF SCHWELM, GERMANY, BY AUGUSTE BRACKELSBERG, ADMINISTRATOR, OF MILSPE, GERMANY

PROCESS AND APPARATUS FOR MELTING DOWN EASILY FUSIBLE ALLOYS

Application filed August 14, 1930, Serial No. 475,189, and in Germany August 20, 1929.

The subject matter of the invention is a process for melting down easily fusible and easily oxidizable metals and alloys, in particular those alloys, such as zinc alloys, which oxidize easily and produce a high waste in the melting processes hitherto usual.

According to the present invention this drawback is avoided by employing for the melting down a rotary tube furnace which is heated to as high a temperature as possible before it is charged with the material to be melted, the firing is then shut off, the material to be melted is introduced into the furnace, and is caused to melt without a flame solely by contact with the heated walls of the rotary tube furnace, the furnace preferably being closed to the outside. The walls of the furnace must of course be so dimensioned and insulated from the outside in such a manner that they are able to take up the total quantity of heat necessary for the melting process and give it up again later to the bath. Since the furnace remains closed during the actual melting process and no free oxygen enters from outside, the melting takes place practically without any oxidation and without any waste. Apart from the fact that the losses hitherto occurring are thereby avoided the product melted in this way is therefore distinguished also by particular purity and good quality.

Figs. 1 and 2 are vertical sections.

A constructional example of a furnace suitable for carrying out the process is illustrated in the drawings. In this $a$ is the drum-shaped iron shell of the furnace which is provided on the inside with a lining $b$ of good insulating mass (preferably of so-called Molerstone). Molerstone is a product resulting from the mixture of molera with cork or other similar material. Further inside there is a second lining $c$ of a material having a high resistance to softening by heat and having also relatively high thermal capacity and relatively low heat insulating properties as compared with the outer lining $b$, the inner surface of which encloses the free interior space of the furnace. The inner lining $c$ may consist of the conventional highly fire-resisting fire bricks which may be chiefly composed of 56 parts silicic acid and 40 parts of clay. At one end of the furnace there is an opening $d$ for the passage of the burner $f$, which may be fed preferably with coal-dust, or other suitable fuel. At the opposite side there is a second opening $g$ for the outflow of the heating gases, which opening can also be used for charging the furnace. The complete furnace is revolubly mounted on rollers $h$ and is also provided with means for its rotation and with a tap hole not illustrated in the drawings. The lining of the furnace $c$ is, as may be seen from the drawings, extraordinarily thick, its mass and composition being such that a relatively large amount of heat may be accumulated when firing the furnace, which is of course, intended to be used again for melting successive charges. For this purpose the volume of the fire-resisting mass is advantageously greater than the volume of the inner space of the furnace.

For realizing the process the furnace first has to be heated up by the burner $f$ until the whole lining of the furnace is brought to the demanded high temperature, (Fig. 1). Then the heat-supply is stopped the burner removed and the material that has to be melted is brought into the furnace through one of the openings $g$ or $d$. Finally both openings $g$ and $d$ are closed by taps $k$ and $i$. (Fig. 2.) By this way the inside of the furnace is separated from the outside air so that during the melting process no oxidizing of the metal can take place.

The invention is, of course, not limited to the example illustrated but other forms of construction of the furnace are possible. It is of the foremost importance that the total quantity of heat required for melting the charge can be taken up, and that, by the movable construction of the furnace, the highly heated walls which act as a heat accumulator can be brought below the charge.

Claims.

1. Process for melting down easily fusible and easily oxidizable metals characterized by the employment of a rotary furnace in such manner that the furnace is first internally heated by means of a flame without the charge, the heating is then shut off, the charge is introduced into the furnace and the furnace is rotated, the charge being melted down solely by contact with the highly heated, rotating walls and external air being excluded.

2. Apparatus for carrying out the process in accordance with claim 1 consisting of a drum furnace which is constructed as a heat accumulator, said furnace comprising, within a metal shell, a lining of an outer, thin insulating jacket and an inner considerably thicker fire resisting mass, the volume of the fire-resisting mass being greater than the volume of the inner space of the furnace, said shell being mounted for rotation and provided not only with openings for flame entrance and gas exit but also with means for closing and opening.

In testimony whereof I affix my signature.

AUGUSTE BRACKELSBERG,
*Administrator of the Estate of Karl Brackelsberg, Deceased.*